United States Patent [19]

Kawai et al.

[11] Patent Number: 4,732,205
[45] Date of Patent: Mar. 22, 1988

[54] MOULDING MACHINE EQUIPPED WITH LONGITUDINAL LAMINATING CORE BOXES

[75] Inventors: Kazuo Kawai, Toyonaka; Sumikazu Kawai, Amagasaki, both of Japan

[73] Assignee: Naniwa Products Co., Ltd., Osaka, Japan

[21] Appl. No.: 840,764

[22] Filed: Mar. 18, 1986

[51] Int. Cl.⁴ .................. B22C 13/12; B22C 15/24
[52] U.S. Cl. ........................ 164/228; 164/200
[58] Field of Search ............ 164/228, 200, 201, 202

[56] References Cited

U.S. PATENT DOCUMENTS 3,965,961 6/1976 Gunnergaard ............... 164/200 X
4,559,989 12/1985 Kawai et al. ................. 164/228

FOREIGN PATENT DOCUMENTS 59-107746 6/1984 Japan ......................... 164/200

Primary Examiner—Nicholas P. Godici
Assistant Examiner—J. Reed Batten, Jr.
Attorney, Agent, or Firm—Larson and Taylor

[57] ABSTRACT

A moulding machine equipped with longitudinal laminating core boxes, characterized in that a plurality of sub-movable die plates are arranged between a fixed die plate and a main movable die plate, and the main movable plate and a plurality of the sub-movable die plates are interlockingly connected by a connecting device and a U-shaped die plate for the moulding machine, in which the die plate has U-shaped cavities where a core box is inserted, in the moulding machine equipped with longitudinal laminating core boxes, in which a plurality of the sub-movable die plates are arranged between the fixed die plate and the main movable die plate, and the main movable plate and a plurality of the sub-movable die plates are interlockingly connected by a connecting device.

11 Claims, 6 Drawing Figures

MOULDING MACHINE EQUIPPED WITH LONGITUDINAL LAMINATING CORE BOXES

This invention relates to a moulding machine equipped with longitudinal laminating core boxes, more particularly to a moulding machine equipped with longitudinal laminating core boxes of an interlocking mechanism in which a plurality of sub-movable die plates each of which is provided with core boxes at both its sides are arranged between a fixed die plate and a main movable die plate, and to a U-shaped die plate for the moulding machine, in which the insertion cavities of the core box of each of said die plates are U-shaped.

Conventional core moulding machines are such that a single core is moulded by one core box at fixed side and one core box at movable side or the core boxes are made double vise type in which the core boxes are provided in parallel either vertically or laterally, and when one vise is rolled over (to discharge sand) the other vise blows sand. A technique of moulding a plurality of molds (including cores) with laminating core boxes (i.e. mating core boxes arranged in a stacked or layered arrangement along a longitudinal axis) by a single moulding cycle has not so far been known. The die plates of this kind of moulding machine are of the mechanism in which core boxes are indirectly set through a fixing leg in the rear surface of each core box being provided with a moulding cavity at its one side, and such die plates are of flat mechanism.

One object of the invention is to mould a plurality of molds of same shape or similar shapes by a single moulding cycle, and above all to provide a moulding machine equipped with longitudinal laminating core boxes, enabling to mould a number of thin molds (such as cores) by one moulding cycle.

According to the present moulding machine a plurality of sub-movable die plates are arranged between a fixed die plate and a main movable die plate, such sub-movable die plates cannot be applied in conventional type die plates, and the die plates have U-shaped cavity in order that both the side surfaces of each of the longitudinal laminating core boxes are made moulding space. Another object of the invention is to provide such die plates.

The invention will now be described more in detail, by way of example, with reference to the accompanying drawings.

One example of the present machine shown in FIGS. 1 to 6 is a moulding machine which can mould, by a single moulding cycle, a number of fin cores for cooling internal combustion engines and which is equipped with longitudinal laminating core boxes of two-face blowing mechanism of a double vise rolling-over (sand discharging) type.

Figure 1:
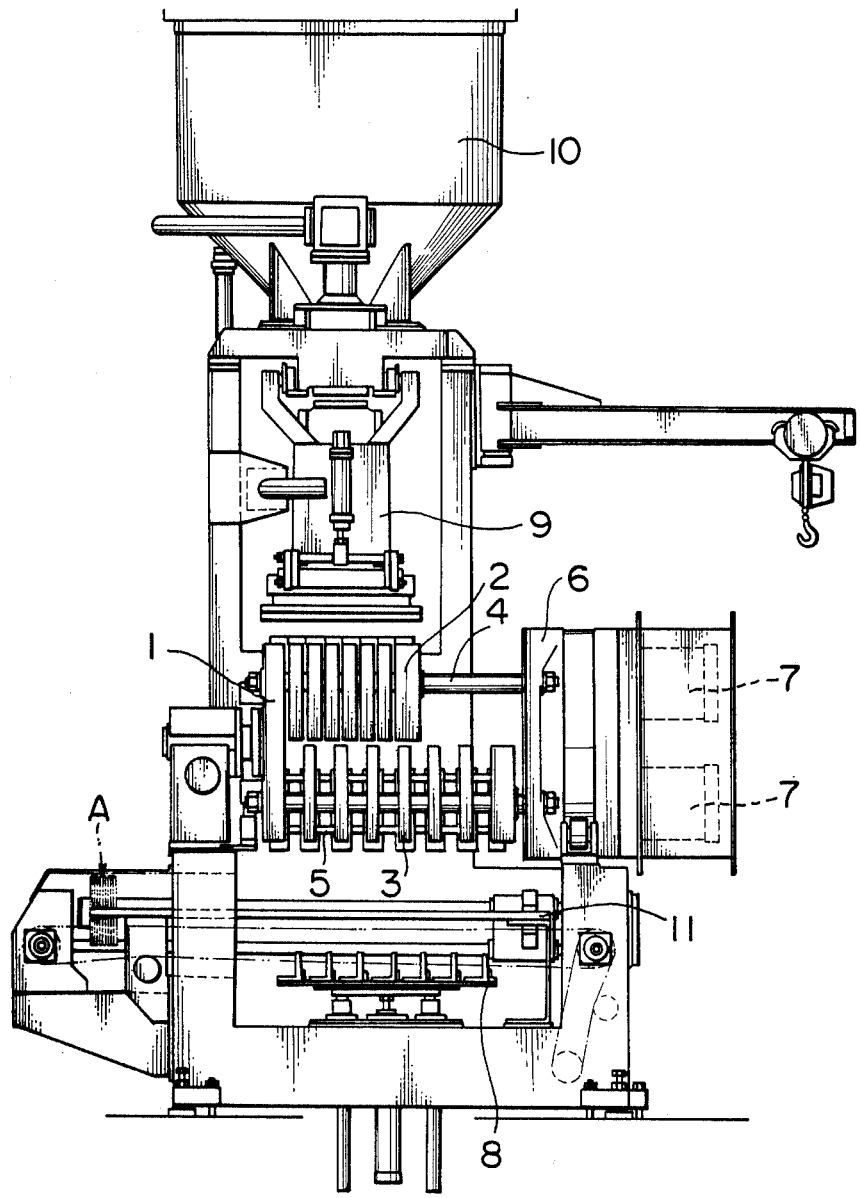
FIG. 1 is a front view of the present moulding machine.

In FIG. 1 reference 1 designates a fixed die plate, reference 2 a main movable die plate, and reference 3 a plurality of sub-movable die plates which are arranged, in a construction as described below, between the fixed die plate 1 and the main movable die plate 2, respectively. Reference 4 designates a guide bar of said main movable die plate 2 and sub-movable die plates 3, and reference 5 connecting pins which connect the fixed die plate 1 with the main movable die plate 2 and the sub-movable die plates 3. Reference 6 shows a plate to which vise cylinders 7 are attached, reference 8 a moulded core ejecting and core box cleaning mechanism equipped with a vertically operational mechanism, reference 9 a blow head, and reference 10 a sand hopper, respectively. The other constructions are the mechanism usually provided in this kind of moulding machine, unless otherwise specified.

Figure 2:
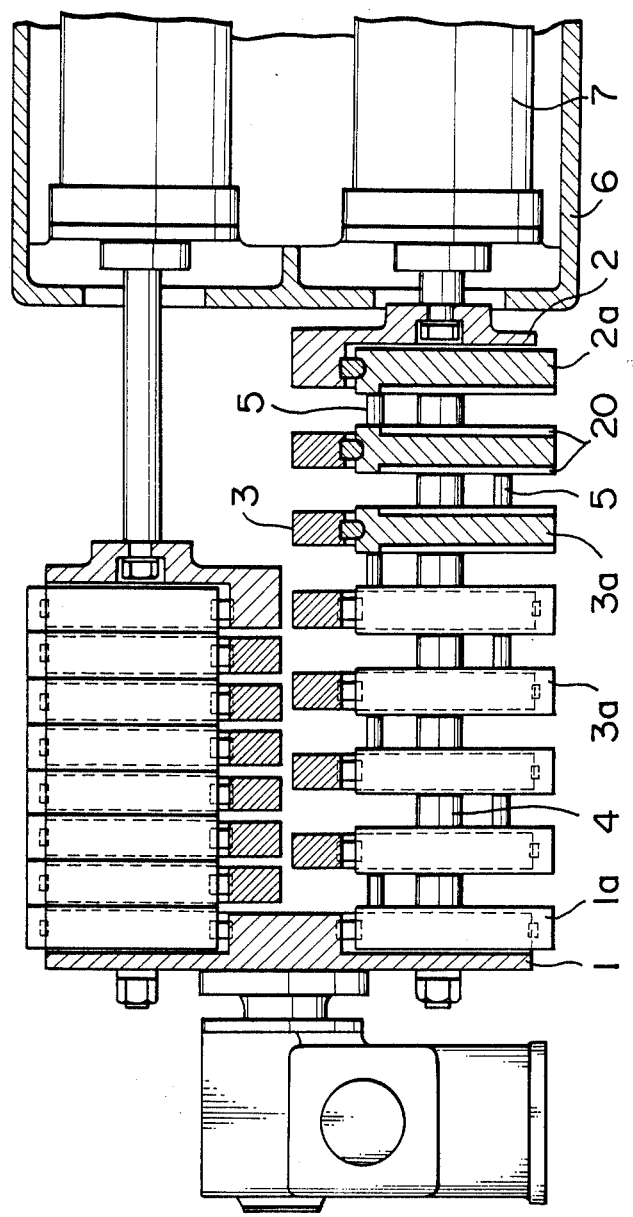
FIG. 2 is a sectional view of a double vice assembly of the present moulding machine.
Figure 3:
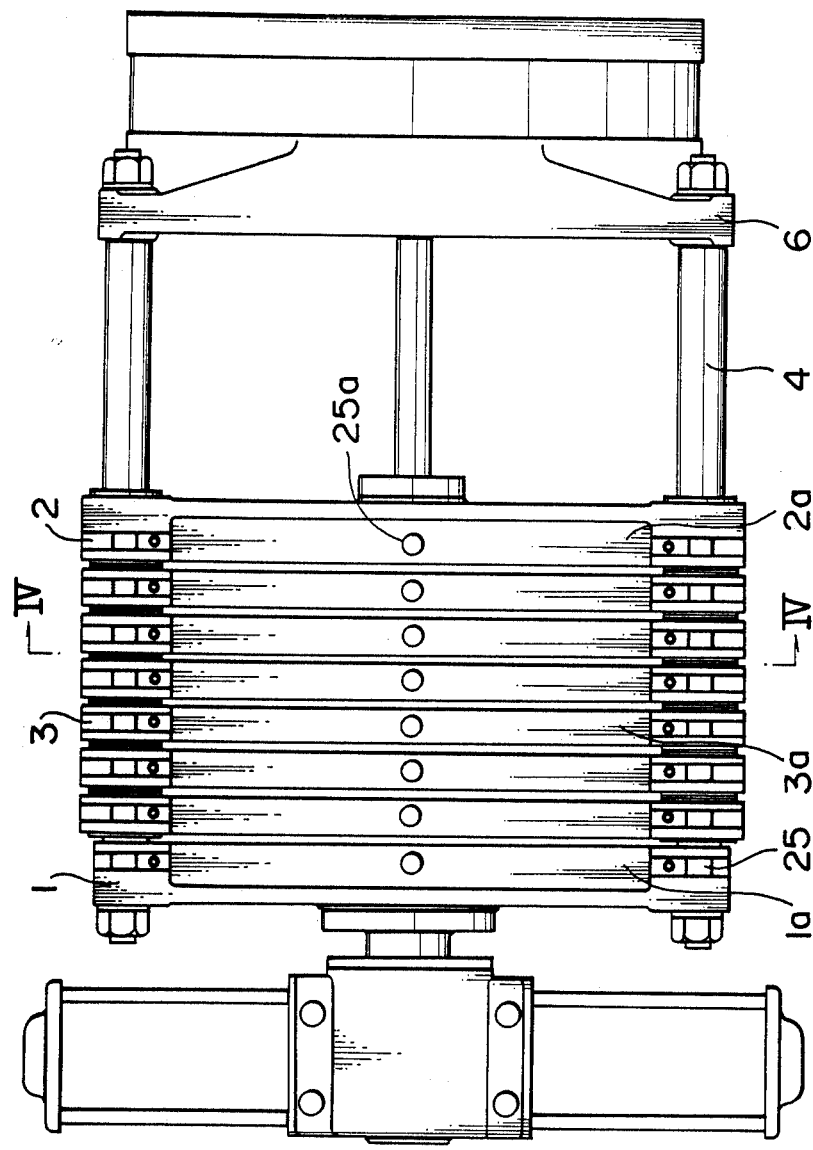
FIG. 3 is a plan view of said double vice assembly.

FIG. 2 illustrates a sectional view of a double vise assembly in which the upper stage shows a state where the vise assembly is closed (when the moulding sand is blown) while the lower stage shows a state where the vise assembly is open (when molds are released, ejected and cleaned). Reference 1a designates a core box set to the fixed die plate 1 and reference 2a a core box set to the main movable die plate 2, and these core boxes 1a and 2a have cavities respectively only at the side of the submovable die plates 3, and the core boxes may sometimes be flat according to the shape of mold to be moulded. Reference 3a shows a core box mounted to each of the submovable die plates 3, and said core box 3a has cavities 20 at its two sides (the surface of the core boxes may occasionally be flat). As shown in FIG. 3, the guide bars 4 are provided passing through both the side ends of a vise assembly, the main die plate 2 and the sub-movable die plates 3 slide by the action of the vise cylinders 7, and these movable die plates open, as shown in the lower stage of FIG. 2, at desired intervals, the movable die plates by respective connecting pins 5 provided on diagonal lines with respective neighbouring die plates.

Each of said die plates of the present moulding machine has cavities for mounting core box to the die plate itself, and said cavities passes through each die plate or are of concave shape which surrounds in U-shape the core box setting cavities.

Figure 4:
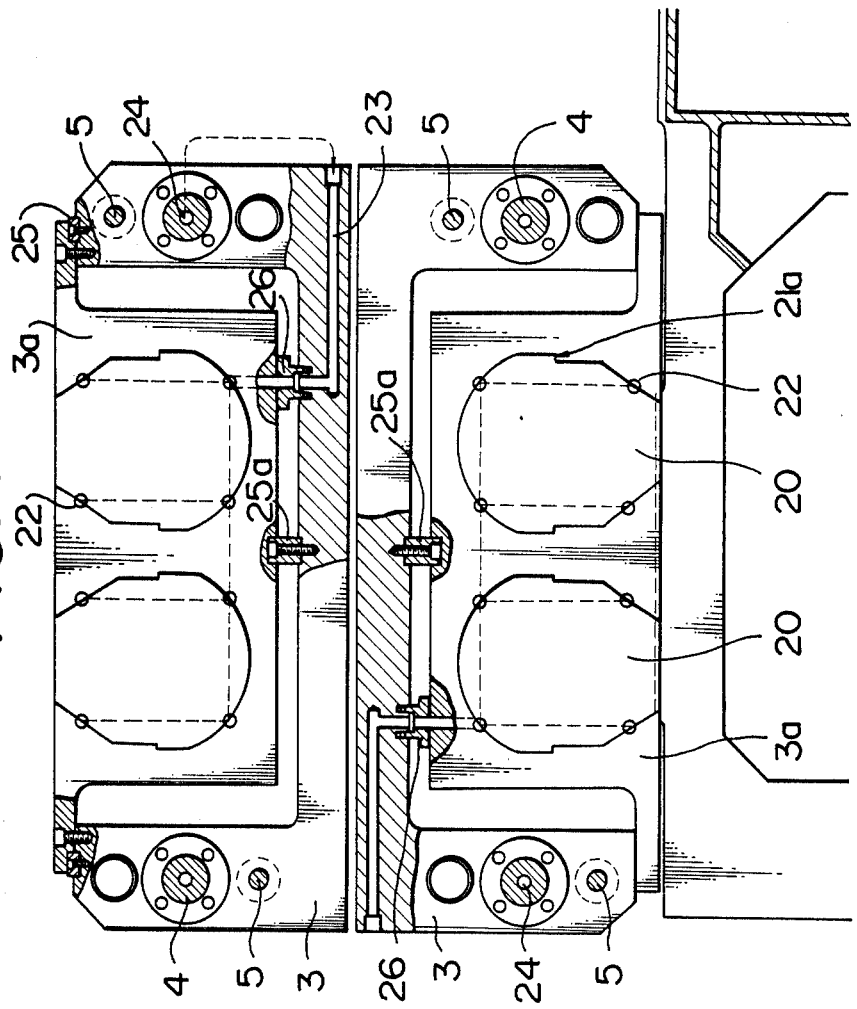
FIG. 4 is a partly sectional front view of said assembly, taken along the line IV—IV of FIG. 3.

FIG. 4 is a front view of the U-shape die plates of the invention, which are set as an assembly of upper and lower double vises. In the drawing reference 3 designates U-shape die plates and reference 3a core boxes mounted to said die plates 3. Said core box 3a may have cavities 20 at both its side faces.

Each of the core boxes 3a is mounted disengageably by setting mechanisms 25 provided at both the end faces of the U-shape die plate 3 and a setting mechanism 25a provided at the inner bottom face of said die plate 3.

Additionally, in FIG. 4, reference 24 shows conduits which are bored at the respective centers of the guide bars 4 and pass electric wiring, gases, compressed air and the like, and reference 23 designates similar conduits provided at the respective die plates. On the other hand, reference 26 shows a socket for communicating the conduit within the core box with the end of said conduit 23 which passes said electric wiring, gases, compressed air or the like to the core box 3a, and reference 22 shows ejector pins housed in each core box.

Figure 5:
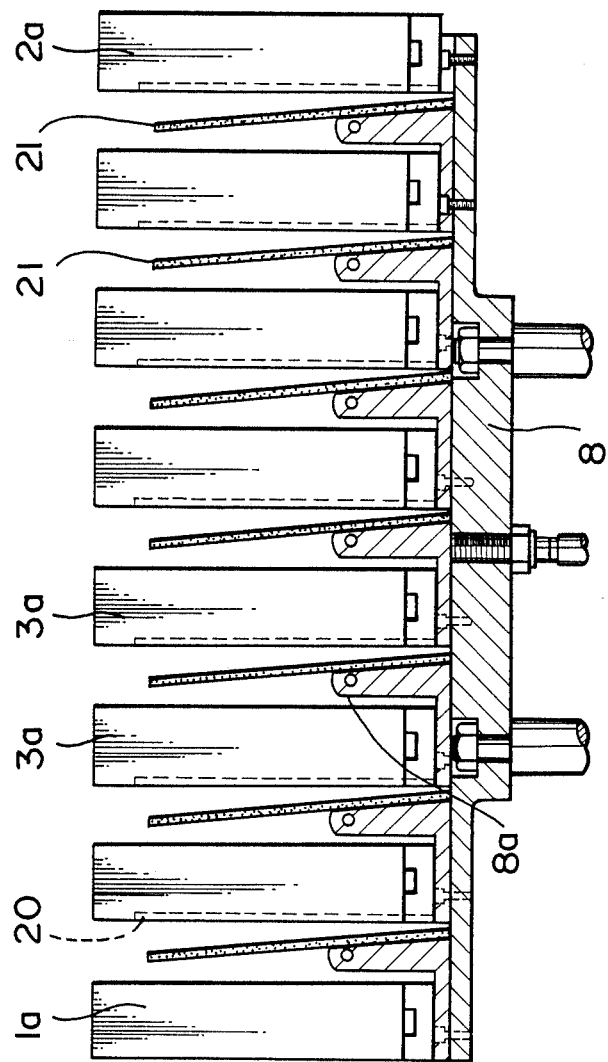
FIG. 5 is a partly sectional front view of a moulded core ejecting and core box cleaning mechanism of the present moulding machine.

FIG. 5 is a front view of the present moulding machine, which shows a moulded core ejecting and core box cleaning mechanism 8 and in which said mechanism 8 is lifted by means of the action of a drive power supply such as compressed air cylinder housed in said mechanism, and each of moulded core receivers 8a of said mechanism 8 is inserted between the respective core boxes of the vise assembly in the open state. By the way, a moulded core 21 is released from the core box by a releasing mechanism housed in each core box, for example by the action of the ejector pins which project by the action of compressed air as described above. The moulded cores 21 are placed respectively on said moulded core receivers 8a, and said moulded core ejecting and core box cleaning mechanism 8 is lowered thereby to eject the moulded cores by suitable moulded core carrying means. In the embodiment cores for fins are shown, so that the machine is explained as a system of discharging a bundle of fin cores in lump as shown with A in FIG. 1, by hooking to a core collecting bar 11 shoulders 21a (FIG. 4) provided at both the sides of each moulded core and by a device (not shown) for narrowing the width of the cores.

On the other hand, the apex of each moulded core receiver 8a of said moulded core ejecting and core box cleaning mechanism 8 is provided with a number of small holes for ejecting compressed air or mold releasing agent, and the mechanism is such that after the discharging of the moulded cores the moulding faces of the core boxes are cleaned and the mold releasing agent is sprayed.

Figure 6:
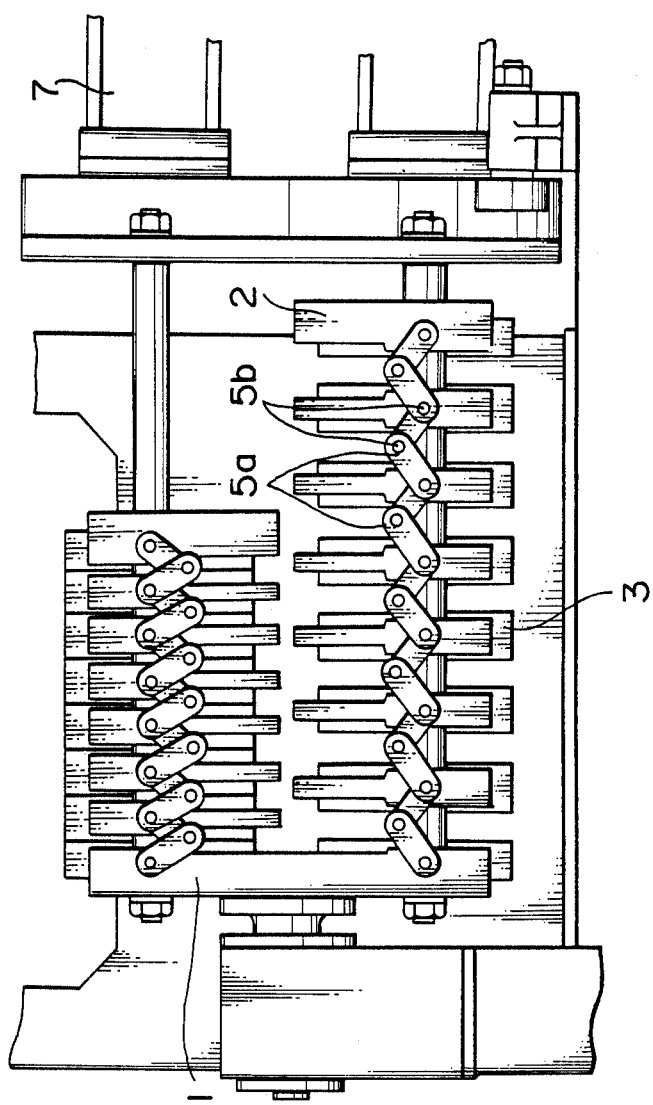
FIG. 6 is a front view of another interlocking mechanism of the longitudinal laminating core boxes of the present moulding machine.

FIG. 6 shows another interlocking mechanism of longitudinal laminating core boxes of the present moulding machine, in which mechanism in place of said connecting pins of the movable die plates levers 5a and shafts 5b for anchoring said levers are combined in a great number of pairs thereby making a so-called accordion system. The other mechanism in FIG. 6 are of the same constitution as the present moulding machine shown in FIGS. 1 to 5.

The moulding cycle of the present machine, which is constituted as described above, will be explained hereunder.

As shown in FIG. 1 or FIG. 2, the longitudinal laminating core boxes in the upper stage of the double vise assembly are set in order by actuating the vise cylinders 7, and then as in ordinary moulding operation the blow head 9 is pressed against the upper surfaces of the laminating core boxes to allow the moulding sand to be blown. After the finishing of the blowing, the moulding sand blown into the cavities 20 of each core box is hardened (by "baking" in the case of Shell process and Hot box process while by "gassing" in the case of cold box process). After the completion of the hardening the vises are rolled over (occasionally sand is discharged) by a rolling-over mechanism similar to known system, and then the laminating core boxes are opened by the action of the vise cylinders, when the main movable die plate 2 fixed to the piston rod of one of said cylinders 7 slides to the right in FIG. 1, and subsequently the respective sub-movable die plates 3, 3, . . . slide in order by the connecting pins 5 thereby to open the molds, resulting in the state of the vise assembly as shown in the lower stage in FIG. 1. Then the moulded core ejecting and core box cleaning mechanism 8 rises, and the moulded cores 21 are released from the core boxes by a releasing mechanism utilizing the compressed air existing in the core boxes whereby the moulded cores are placed on said receivers 8a. After the finishing of the releasing operation, said mechanism 8 is lowered to collect in a set the moulded cores 21 by a moulded core carrier as shown in the position A of FIG. 1. While inserting again said moulded core ejecting and core box cleaning mechanism 8 into each die plate, compressed air is ejected to clean the interior of each core box, and if necessary, also to spray the mold releasing agent. The laminating core boxes is then rolled over while being closed and they are transferred to a following moulding cycle.

The moulding machine of the present invention has been described above with regard to an embodiment of moulding fin cores for cooling internal combustion engines. However, since said cooling fins in a set are of slightly different shapes as is known, the cavities of the core boxes are also different respectively. According to the invention it is possible to mould a set of cores in required arranging sequence by a single moulding cycle by arranging a group of core boxes in accordance with the arranging sequence when said cores are used.

Though in the above embodiment a moulded core ejecting and core box cleaning mechanism of specific structure has been explained it will be easier to the skilled in the art to change the design to replace the system by a conveying mechanism by which a group of aiming moulded cores can be discharged in one set, such as conveyor system.

Accordingly the present invention provides, without being limited to the above embodiment, a moulding machine in which it is possible to mould quickly and accurately a group of cores of different shapes as one set by a single moulding cycle.

Additionally, the moulding means has been described above in relation to the one of using laminating core boxes which could be successfully developed by the application of the U-shaped die plates of the invention, but it will be evident to the skilled in the art that the U-shaped die plates of the invention can be used, too, as die plates at both the movable and fixed sides, of conventional moulding machines.

Further, the present moulding machine can be applied for moulding not only molds which uses moulding sand as material as described above but also extinguishing molds consisting of foamed resin in the form of resin beads according to Lost Foam Process developed by firm G.M.

Although the construction and operating mode of the present moulding machine are described above, the functions and effects based on such construction are as follows:

(1) A plurality of molds can be moulded by a single moulding cycle.
(2) A number of thin molds such as cores, of same or similar shapes can be moulded by a single moulding cycle, and it is possible to mould a set of cores or the like required for the subsequent mold assembling process by a single moulding cycle and convey them in a set.
(3) According to known systems, in the case of moulding a lot of molds either lots of moulding machines were or a multiple station moulding machine was needed, so that a wide installation area was needed and naturally the equipment was expensive. According to the present invention, however, a single moulding machine suffices.
(4) Since the sub-movable (or intermediate) die plates are U-shaped it is capable of using both the side faces of each of the intermediate core boxes as core boxes, and therefore laminating core boxes can be loaded thereby making a multiple stage moulding possible.

(5) Since compressed air is used for ejecting and releasing moulding cores specific power mechanisms such as cylinders for ejection and release are no longer necessary. Additionally the ejector pins can be withdrawn by the closing action of the vises, i.e. the structure is such that the end faces of the ejector pins can be pressed against the parting faces of the core boxes, said faces being in response to the ejector pins.

(6) In known vertical split moulding systems a core box retaining a moulded core is rolled over 90° either upwardly or downwardly before the core is released and discharged. According to the present invention, however, release and discharge can be effected without the abovementioned rolling-over operation of core box.

(7) Conventional die plates have so far been used at their one side only by indirect attachment through a fixing leg in the rear face of core box, but thanks to the development of U-shaped die plates it is now capable of simultaneously moulding a great number of cores by providing cavities at both the side faces of one core box and combining a plurality of core boxes in laminating layers.

(8) A core box is set to a U-shaped die plate in such a manner that one or more positioning holes provided at the lower side face of the core box are fitted to the pin or pins at the bottom face of the die plate, the fixing device at the two ends in the upper surface of the core box is placed on the upper surface of the die plate, and then positioning key or pin is fitted to fix the fastening. Thus the core box can be easily replaced while the time for replacing the core box is greatly shortened.

(9) In conventional core boxes heat supply (such as electricity or gas) for heating, gas piping for gassing, and air piping for actuating ejection pins for cores are set indirectly connected. According to the present invention, however, the core boxes are set to the U-shaped die plates under the so-called plug-in system through the guide ports provided in the U-shaped die plates, and at the same time said power supply, gas piping and air piping are connected directly to the core boxes. Therefore, specific piping and wiring and space are no longer necessary. Specific work for the connection is also not required.

(10) Since the present system is mounting a core box having cavities at both its side faces into a U-shaped die plate the space between vises can be reduced, so that in addition to reduction of manufacturing cost and simplification of core box setting system a more compact moulding machine can be constructed over the conventional system where core boxes are to the two surfaces of a flat die plate, thereby presenting great merits.

We claim:

1. A moulding machine comprising:
a fixed die plate;
a main movable die plate;
a plurality of sub-movable die plates arranged between said fixed die plate and said main movable die plate along a longitudinal axis;
a plurality of core boxes adapted to form a longitudinal laminate of adjacent said core boxes for moulding a mold between each pair of adjacent said core boxes, a respective said core box being disposed in a respective said die plate; and
a connecting means for interlockingly connecting said main movable plate and said sub-movable plates.

2. A moulding machine as described in claim 1 wherein said connecting means consists of connecting pins.

3. A moulding machine as described in claim 1 wherein each of the core boxes located in a respective said die plate has a respective releasing mechanism using compressed air.

4. A moulding machine as described in claim 1 and further including a moulding core releasing mechanism of a rolling-over system double vise type equipped with a cleaning mechanism below double vises of said releasing mechanism.

5. A moulding machine as described in claim 1 wherein each said core box has two faces provided with cavities for moulding the mold.

6. A moulding machine as described in claim 1 wherein said connecting means consists of levers and lever connecting shafts.

7. A moulding machine as described in claim 1 said plates are U-shaped and have a U-shaped cavity in which one of said core boxes is located.

8. A moulding machine as described in claim 7 wherein core box setting mechanisms are provided in each die plate in the U-shaped cavity and at each upper and face of said U-shaped plate.

9. A moulding machine as described in claim 7 wherein the U-shaped die plate is bored with conduits for piping and wiring.

10. A moulding machine as described in claim 7 wherein the U-shaped die plate is equipped with a connecting mechanism with the neighboring die plate.

11. A moulding machine comprising:
a fixed die plate;
a main movable die plate;
a plurality of sub-movable die plates;
a mounting means for mounting said sub-movable plates along a longitudinal axis between said main movable plate and said fixed plate and for movably mounting said sub-movable plates and said main movable plate for reciprocal movement relative to said fixed die plate along the longitudinal axis;
a plurality of core boxes adapted to form a longitudinal laminate for moulding a plurality of molds therebetween;
a setting means for setting a respective said core box in a respective said sub-movable plate whereby a mating movement of said submovable plates toward said fixed plate form the longitudinal laminate; and
a connecting means for interlockingly connecting said main movable plate, said sub-movable plates and said fixed plate such that movement of said main movable plate away from said fixed plate along the longitudinal axis causes all of said plates to be separated from one another.

* * * * *